(12) United States Patent
Mackert

(10) Patent No.: US 8,789,880 B2
(45) Date of Patent: Jul. 29, 2014

(54) LINK CHAIN

(75) Inventor: Michael Mackert, Rüthen (DE)

(73) Assignee: Kintec-Solutions GmbH, Rietberg (DE)

( * ) Notice: Subject to any disclaimer, the term of this patent is extended or adjusted under 35 U.S.C. 154(b) by 1437 days.

(21) Appl. No.: 12/516,704

(22) PCT Filed: Nov. 15, 2007

(86) PCT No.: PCT/EP2007/062390
§ 371 (c)(1),
(2), (4) Date: Jan. 29, 2010

(87) PCT Pub. No.: WO2008/065008
PCT Pub. Date: Jun. 5, 2008

(65) Prior Publication Data
US 2010/0141005 A1 Jun. 10, 2010

(30) Foreign Application Priority Data

Nov. 30, 2006 (DE) .......................... 10 2006 056 953
Dec. 14, 2006 (DE) .......................... 10 2006 058 948

(51) Int. Cl.
*A47C 1/02* (2006.01)

(52) U.S. Cl.
USPC ............................ 297/91; 297/85 R; 474/207

(58) Field of Classification Search
USPC ........ 297/91, 366, 367 R; 474/202, 206, 207, 474/226, 227, 228, 230
See application file for complete search history.

(56) References Cited

U.S. PATENT DOCUMENTS

| | | | |
|---|---|---|---|
| 4,047,758 A | * | 9/1977 | Whitehill .................... 297/284.1 |
| 4,410,213 A | * | 10/1983 | Samson ........................... 297/84 |
| 4,865,387 A | | 9/1989 | Lipparini et al. |
| 4,997,156 A | * | 3/1991 | Allen .......................... 248/311.2 |
| 5,013,084 A | * | 5/1991 | May ............................ 297/85 R |
| 5,918,942 A | * | 7/1999 | Olsen ......................... 297/423.32 |

(Continued)

FOREIGN PATENT DOCUMENTS

| | | |
|---|---|---|
| DE | 2059143 A | 6/1971 |
| DE | 8807226 U1 | 9/1988 |

(Continued)

OTHER PUBLICATIONS

English Translation of the International Preliminary Report on Patentability from corresponding Patent Cooperation Treaty Patent Application No. PCT/EP2007/062390 mailed Jun. 11, 2009.
International Search Report and Written Opinion of the International Searching Authority from corresponding Patent Cooperation Treaty (PCT) Application No. PCT/EP2007/062390, mailed Mar. 13, 2008.

* cited by examiner

*Primary Examiner* — David R Dunn
*Assistant Examiner* — Alexander Harrison
(74) *Attorney, Agent, or Firm* — Gardner, Linn, Burkhart & Flory, LLP

(57) ABSTRACT

The invention relates to a link chain having two rows of chain elements wherein the chain elements of one row are rotatably connected to those of the adjacent row in the chain plane in such a way that each chain element has two rotational axes, of which each one of the two rotational axes of two different chain elements is in adjacent rows, and that the chain elements of one row are connected to one another by means of toothings of their ends in such a way that the chain is flexible in the chain plane, wherein the rotational axes are designed such that the chain remains in a set position.

11 Claims, 4 Drawing Sheets

(56) References Cited

U.S. PATENT DOCUMENTS

| | | | |
|---|---|---|---|
| 6,142,558 A * | 11/2000 | May | 297/75 |
| 6,387,001 B1 * | 5/2002 | Markley | 474/202 |
| 8,069,645 B2 * | 12/2011 | Mackert | 59/85 |
| 8,156,612 B2 * | 4/2012 | Yamashita | 16/354 |
| 2004/0058765 A1 | 3/2004 | Kubein-Meesenburg et al. | |
| 2005/0179296 A1 * | 8/2005 | Bruck et al. | 297/361.1 |
| 2006/0194664 A1 * | 8/2006 | Wang | 474/206 |
| 2007/0249448 A1 * | 10/2007 | Wu | 474/206 |
| 2007/0265124 A1 * | 11/2007 | Wang | 474/206 |
| 2009/0309403 A1 * | 12/2009 | Mackert | 297/354.13 |
| 2011/0263368 A1 * | 10/2011 | Fujiwara | 474/206 |

FOREIGN PATENT DOCUMENTS

| | | |
|---|---|---|
| DE | 9300559.8 U1 | 10/1993 |
| DE | 9311519.9 U1 | 1/1995 |
| DE | 10018567 C2 | 4/2002 |
| EP | 1498298 A1 | 1/2005 |
| FR | 2736250 A1 | 1/1997 |
| GB | 1339018 A * | 11/1973 |
| WO | 02/50451 A1 | 6/2002 |

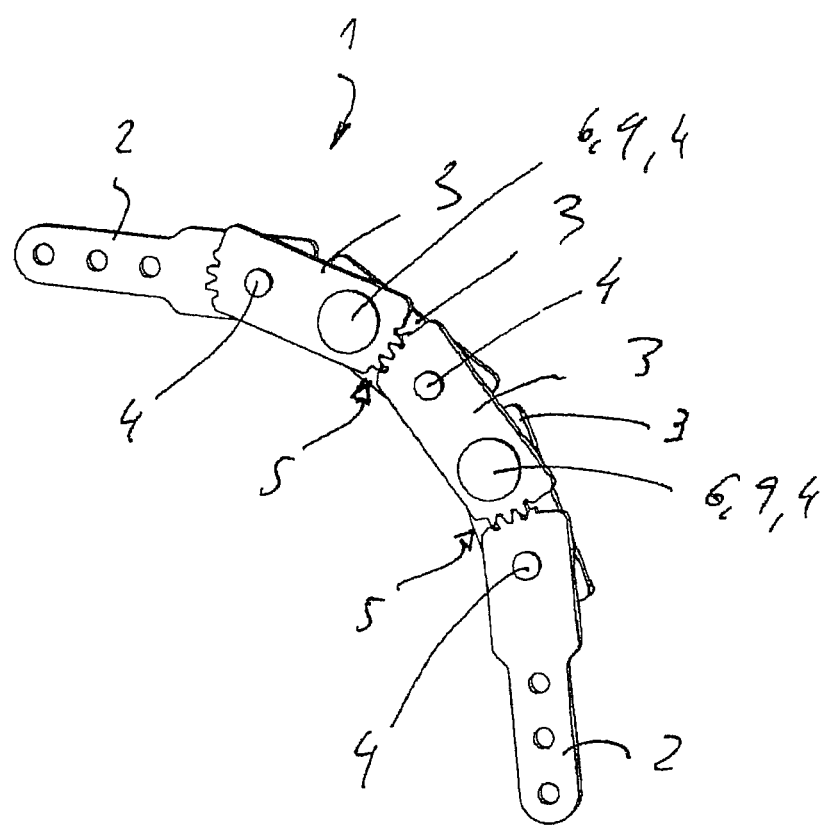

LINK CHAIN

CROSS REFERENCE TO RELATED APPLICATION

This application claims the priority benefits of International Application No. PCT/EP2007/062390 filed Nov. 15, 2007, which is hereby incorporated herein by reference in its entirety.

BACKGROUND OF THE INVENTION

The invention relates to a link chain having two or more rows of chain elements.

A continually variable surface is disclosed in DE 20 59 143 A. The surface described therein is divided into several rows of surface elements, wherein the surface elements of one row are rotatably connected to those of an adjacent row in the surface plane in such a manner that each surface element has two pivot points, of which each one of the two pivot points of two different surface elements is in adjacent rows. The surface elements in the same row are interconnected by means of movement transmission parts such that the surface is flexible in its plane. This surface renders it possible to produce continuously variable, curved surfaces by means of control elements which are disposed merely at one end of the respective surface.

SUMMARY OF THE INVENTION

The invention provides a link chain, in which the chain not only permits a continuous variation in its curvature, but also maintains the adjusted curvature without the application of force, e.g. by means of actuating elements or control elements.

Since the chain elements of one row of the link chain are interconnected by means of toothing arrangements on their ends such that the chain is flexible in the chain plane, and the rotational axes are configured in such a manner that the chain remains in an adjusted position, it is possible not only to vary this type of link chain in curvature by means of unidirectional action but also to maintain the varied adjustment even after adjustment has been completed.

This permits diverse possible applications, in particular in the construction of so-called reclining chairs. Chairs of this kind comprise a backrest which is pivotable with respect to a seat surface, and a leg support which can be pivoted outwards, wherein the chair can be pivoted between a sitting position and a lying position. They permit an adjustment of the position between a "normal" upright sitting position and an approximately horizontally aligned lying position. The backrest and/or head supports are optionally also adjustable and are coupled in part with the adjusting movement of the chair or can be manually adjusted independently thereof. Therefore, this type of chain is suitable for transmitting the adjusting movement and for maintaining an adjusted position of the chair. It is therefore possible in a convenient and elegant manner to produce chairs which permit a plurality of adjustable positions.

It is also feasible to use the chain in sofas or the like for the adjustment of head supports or arm rests.

In one embodiment, the rotational axes have a turning moment adjustment. Therefore, the "holding force" can be specified for an adjusted position of the chain. This permits a selection of the parameters, i.e. of the turning moment, such that although an adjustment of the chain is possible this must be done deliberately. It is understood that a rivet-connection permits a particularly convenient design. However, any other type of corresponding connection can also be utilised, such as e.g. a screw-connection.

The rotational axes may comprise a synthetic material disk and a synthetic material bushing, wherein it is preferred if the synthetic material disk and synthetic material bushing are formed from elastic synthetic material.

The synthetic material disk and bushing of the rotational axis may be compressible in such a manner that a turning moment of the rotational axis can be adjusted or specified.

The synthetic material disk may be disposed between the respective chain elements of different rows. In so doing, the rotational axis passes expediently through it.

The synthetic material bushing may be disposed between the rivet and the chain element. In so doing, the rotational axis passes through it and it is pressed against the chain element.

Therefore, the turning moment of each rotational axis can be adjusted by the tension of the rotary connection, since by reason of their elasticity after compression the synthetic material disk and synthetic material bushing produce a corresponding mutual friction between the chain elements, which produces the described turning moment.

The rotational axes may have a turning moment of at least 1 NM. Then the chain can be used in a particularly advantageous manner in the reclining chairs stated above. Therefore, by virtue of the weight force of the users, it is possible to adjust e.g. the leg support, but it remains in the adjusted position in spite of the lower weight force of the legs lying thereon. The same applies to usage in sofas and the like.

The rotational axes may be riveted from alternating sides of the row.

Further details and advantages are apparent in the description hereinafter of an exemplified embodiment with reference to the drawing, in which

BRIEF DESCRIPTION OF THE DRAWINGS

FIG. 4 shows the link chain of FIG. 1 in a curved position in a perspective view from the side.

DETAILED DESCRIPTION OF THE PREFERRED EMBODIMENT

Figure 1:
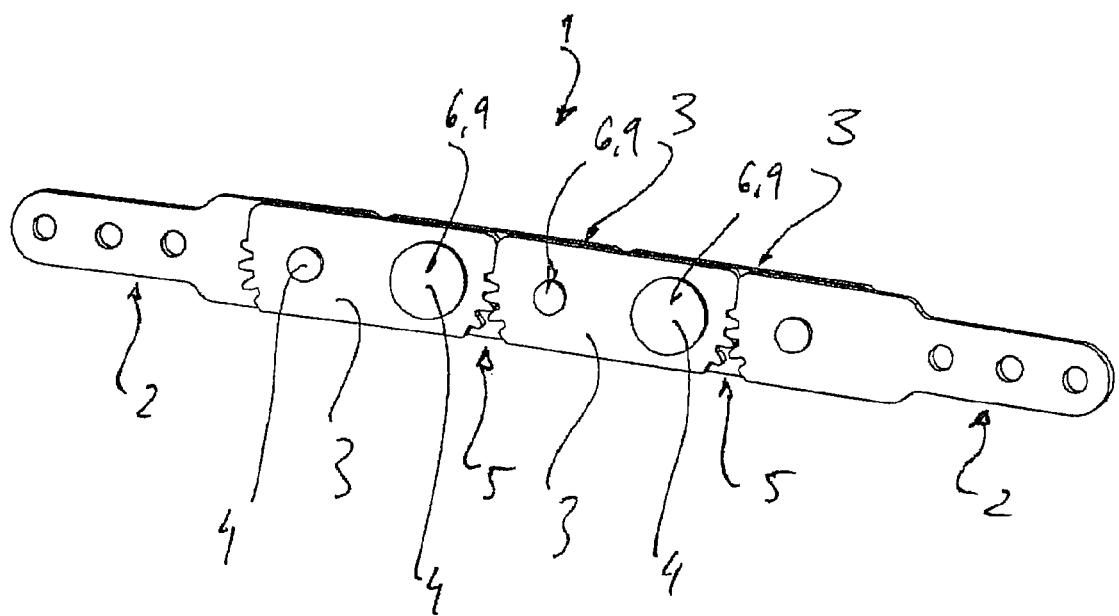
FIG. 1 shows a link chain in an approximately linear position in a perspective view from the side.
Figure 2:
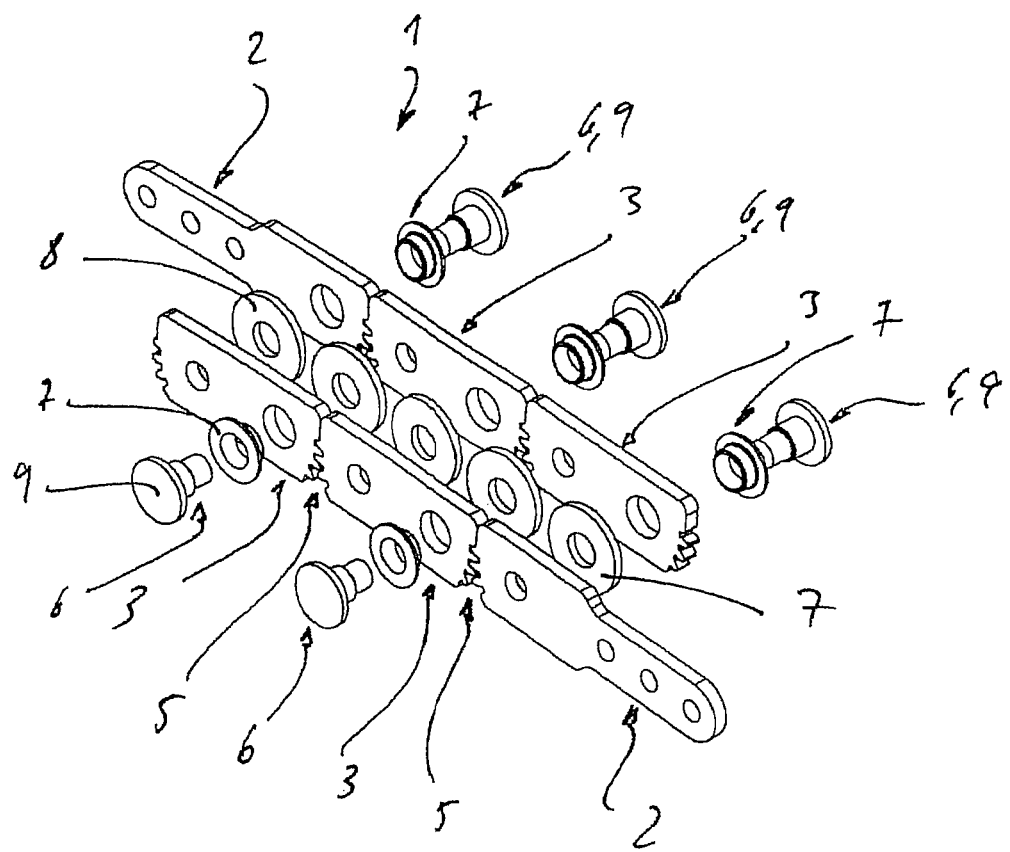
FIG. 2 shows the link chain of FIG. 1 in a corresponding perspective, exploded view.
Figure 3:
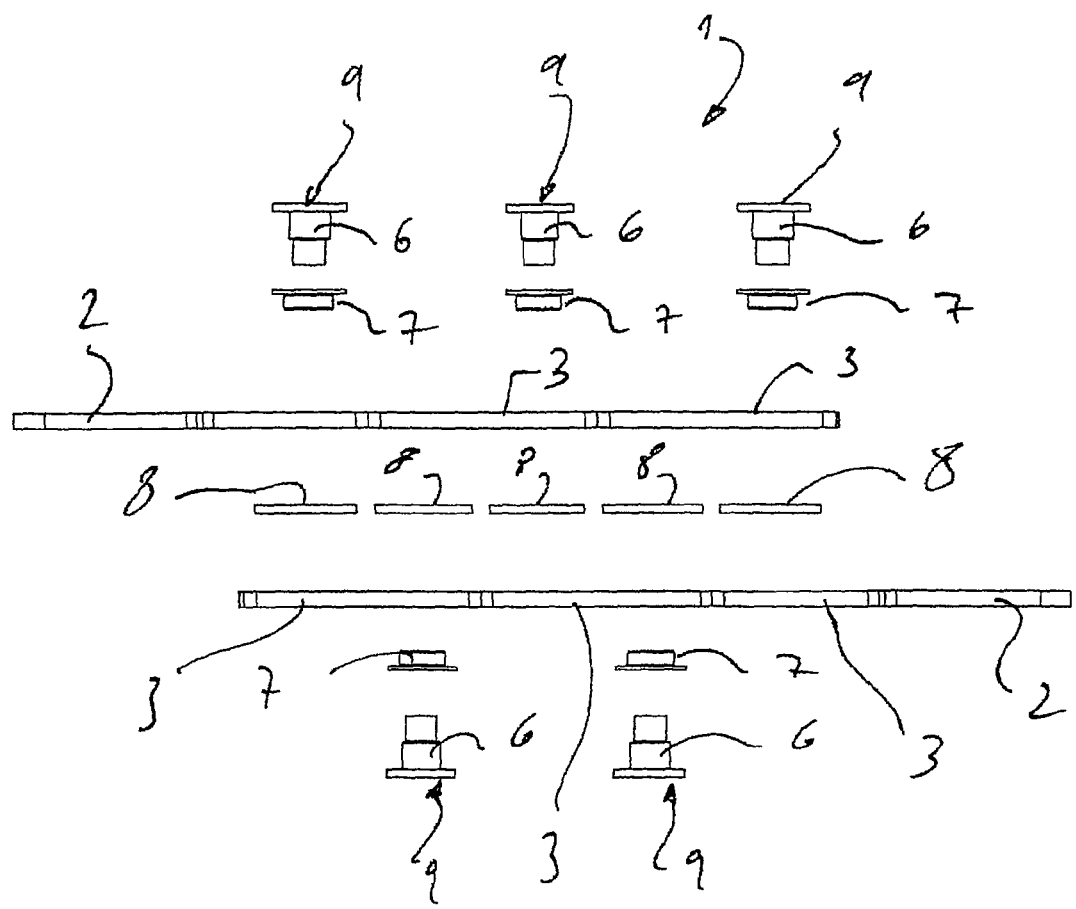
FIG. 3 shows the link chain of FIG. 1 in a corresponding exploded view from above.

Referring now to the drawings and the illustrative embodiments depicted therein, a link chain 1 comprises two rows of chain elements. Each row comprises an end chain element 2 and several chain elements 3. The end chain elements 2 of the rows are disposed on respectively remote ends of the link chain 1 and comprise attachment options.

The chain elements 2 or 3 of one row are rotatably connected to those of the adjacent row in the chain plane via rotational axes 4. Each chain element 2 has two rotational axes 4, of which each one of the two rotational axes 4 of two different chain elements 3 is in adjacent rows.

The end chain elements 2 each comprise only one rotational axis 4.

The chain elements 2, 3 of one row are interconnected by means of toothing arrangements 5 on their ends, so that the chain is flexible in the chain plane and an initiated movement of the end chain elements is transmitted to the adjacent chain elements 3, so that the chain is adjustable in curvature.

In the present example, the rotational axes 4 are provided by a rivet-connection by means of rivets 6.

The rivets 6 comprise a widened disk-shaped head 9 which presses a synthetic material bushing 7 against the surface of the respective chain element of one row. At the same time, the synthetic material bushing 7 engages into the corresponding bore in the respective chain element and the rivet 6 passes through it.

The rivet 6 also passes through the respective other chain element of the adjacent row, wherein the rivet 6 passes through a synthetic material disk 8 which is disposed between the respective chain elements 3 of the rows.

The synthetic material bushing 7 and the synthetic material disk 8 are each produced from elastic material, so that they are compressed when riveted accordingly.

Therefore, each rotational axis 4 is provided with an adjustable tension and friction which produces a specifiable turning moment of the respective rotational axis 4.

Therefore, the link chain 1 can be varied in curvature by initiating a movement at a fixed end chain element 2 by the application of a force which overcomes the adjusted turning moment. The chain maintains the adjusted curvature until in turn a force which overcomes the adjusted turning moment is applied once again.

The chain can thus be used e.g. in the above-described reclining chairs. By virtue of the total weight force of the users, it is then possible to adjust e.g. the leg support from one position to another during pivoting of the chair, but it remains in the adjusted position in spite of the lower weight force of the legs lying thereon.

Changes and modifications in the specifically described embodiments can be carried our without departing from the principles of the present invention, which is intended to be limited only by the scope of the appended claims, as interpreted according to the principles of patent law including the doctrine of equivalents.

The invention claimed is:

1. Link chain comprising:
   two or more rows of chain elements, wherein the chain elements of one row are rotatably connected to those of the adjacent row in a chain plane in such a manner that each chain element has two rotational axes;
   wherein each one of the two rotational axes of two different chain elements is in adjacent rows;
   toothing arrangements on facing ends of said chain elements interconnecting the chain elements of one row wherein the chain is flexible in the chain plane, wherein the rotational axes are configured in such a manner that the chain responds to a force that applies a turning moment to the axes to move to an adjusted position and remains in the adjusted position when the force is reduced and wherein the turning moment of the rotational axes is adjustable, wherein the rotational axes comprise a synthetic material disk and a synthetic material bushing, wherein the synthetic material disk and the synthetic material bushing are formed elastic synthetic material and wherein the synthetic material disk and the synthetic material bushing of the rotational axes are compressed by an adjustable amount of compression to thereby adjust the tuning moment of the rotational axes.

2. Link chain as claimed in claim 1, wherein the synthetic material disk is disposed between the respective chain elements of different rows.

3. Link chain as claimed in claim 2, wherein the synthetic material bushing is disposed between the rotational axis and the chain element.

4. Link chain as claimed in claim 3, wherein the turning moment of the rotational axes is at least 1 NM.

5. Link chain as claimed in claim 4, wherein the rotational axes are riveted from alternating sides of the row.

6. A reclining chair, or a sofa comprising:
   a backrest and a seat surface,
   a link chain providing adjustment of said backrest with respect to said seat surface, said link chain having two or more rows of chain elements, wherein the chain elements of one row are rotatably connected to those of the adjacent row in a chain plane in such a manner that each chain element has two rotational axes, wherein each one of the two rotational axes of two different chain elements is in adjacent rows; and
   said link chain further including toothing arrangements on facing ends of said chain elements interconnecting the chain elements of one row wherein the chain is flexible in the chain plane, wherein the rotational axes are configured in such a manner that the chain responds to a force that applies a turning moment to the axes to move to an adjusted position and remains in the adjusted position when the force is reduced and wherein the turning moment of the rotational axes is adjustable, wherein the rotational axes comprise a synthetic material disk and a synthetic material bushing, wherein the synthetic material disk and the synthetic material bushing are formed from elastic synthetic material and wherein the synthetic material disk and the synthetic material bushing of the rotational axes are compressed by an adjustable amount of compression to thereby adjust the tuning moment of the rotational axes.

7. The reclining chair or a sofa as claimed in claim 6, wherein the synthetic material disk is disposed between the respective chain elements of different rows.

8. The relining chair or a sofa as claimed in claim 7, wherein the synthetic material bushing is disposed between the rotational axis and the chain element.

9. The reclining chair or a sofa as claimed in claim 6, wherein the rotational axes have a turning moment of at least 1 NM.

10. The reclining chair or a sofa as claimed in claim 6, wherein the rotational axes are riveted from alternating sides of the row.

11. The reclining chair or a sofa as claimed in claim 7, wherein the synthetic material bushing is disposed between the rotational axis and the chain element.

* * * * *

UNITED STATES PATENT AND TRADEMARK OFFICE
CERTIFICATE OF CORRECTION

PATENT NO. : 8,789,880 B2
APPLICATION NO. : 12/516704
DATED : July 29, 2014
INVENTOR(S) : Michael Mackert It is certified that error appears in the above-identified patent and that said Letters Patent is hereby corrected as shown below:

On the title page
In the Heading

"(73) Assignee; Kintec-Solutions GmbH, Rietberg (DE)" should be
--(73) Assignee; Kintec-Solution GmbH, Rietberg (DE)--

In the claims

Column 3
Line 56, Claim 1, insert --from-- after "formed"
Column 4
Line 3, Claim 1, "tuning" should be --turning--
Line 39, Claim 6, "tuning" should be --turning--
Line 44, Claim 8, "relining" should be --reclining--

Signed and Sealed this
Fifteenth Day of December, 2015

Michelle K. Lee
*Director of the United States Patent and Trademark Office*